(12) United States Patent
Robaina et al.

(10) Patent No.: US 11,461,982 B2
(45) Date of Patent: *Oct. 4, 2022

(54) 3D OBJECT RENDERING USING DETECTED FEATURES

(71) Applicant: Magic Leap, Inc., Plantation, FL (US)

(72) Inventors: Nastasja U. Robaina, Coconut Grove, FL (US); Nicole Elizabeth Samec, Fort Lauderdale, FL (US); Gregory Michael Link, Charlotte, NC (US); Mark Baerenrodt, Millbrae, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/174,195

(22) Filed: Feb. 11, 2021

(65) Prior Publication Data

US 2021/0350623 A1 Nov. 11, 2021

Related U.S. Application Data

(63) Continuation of application No. 15/839,654, filed on Dec. 12, 2017, now Pat. No. 10,922,887.
(Continued)

(51) Int. Cl.
*G06T 19/00* (2011.01)
*G02B 27/01* (2006.01)
(Continued)

(52) U.S. Cl.
CPC .......... *G06T 19/006* (2013.01); *G02B 6/0008* (2013.01); *G02B 6/0016* (2013.01);
(Continued)

(58) Field of Classification Search
CPC .. G06T 19/006; G02B 6/0008; G02B 6/0016; G02B 6/0035; G02B 6/0068;
(Continued)

(56) References Cited

U.S. PATENT DOCUMENTS 6,850,221 B1 2/2005 Tickle
8,950,867 B2 2/2015 Macnamara
(Continued)

FOREIGN PATENT DOCUMENTS

JP 2006-050165 A 2/2006
JP 2008-508591 A 3/2008
(Continued)

OTHER PUBLICATIONS

Invitation to Pay Additional Search Fees, for PCT Application No. PCT/US2017/065850, dated Jan. 31, 2018.
(Continued)

*Primary Examiner* — Xin Sheng
(74) *Attorney, Agent, or Firm* — Knobbe, Martens, Olson & Bear, LLP

(57) ABSTRACT

An augmented reality display system is configured to use fiducial markers to align 3D content with real objects. The augmented reality display system can optionally include a depth sensor configured to detect a location of a real object. The augmented reality display system can also include a light source configured to illuminate at least a portion of the object with invisible light, and a light sensor configured to form an image using reflected portion of the invisible light. Processing circuitry of the display system can identify a location marker based on the difference between the emitted light and the reflected light and determine an orientation of the real object based on the location of the real object and a location of the location marker.

20 Claims, 12 Drawing Sheets

Related U.S. Application Data

(60) Provisional application No. 62/433,767, filed on Dec. 13, 2016.

(51) Int. Cl.
*F21V 8/00* (2006.01)
*G02B 27/00* (2006.01)

(52) U.S. Cl.
CPC ......... *G02B 6/0035* (2013.01); *G02B 6/0068* (2013.01); *G02B 6/0076* (2013.01); *G02B 6/0088* (2013.01); *G02B 27/0081* (2013.01); *G02B 27/0172* (2013.01); *G02B 2027/014* (2013.01); *G02B 2027/0138* (2013.01); *G02B 2027/0187* (2013.01)

(58) Field of Classification Search
CPC ............... G02B 6/0076; G02B 6/0088; G02B 27/0081; G02B 27/0172; G02B 2027/0138; G02B 2027/014; G02B 2027/0187
See application file for complete search history.

(56) References Cited

U.S. PATENT DOCUMENTS

| | | | |
|---|---|---|---|
| 9,081,426 | B2 | 7/2015 | Armstrong |
| 9,215,293 | B2 | 12/2015 | Miller |
| 9,310,559 | B2 | 4/2016 | Macnamara |
| 9,348,143 | B2 | 5/2016 | Gao et al. |
| D758,367 | S | 6/2016 | Natsume |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,552,674 | B1 | 1/2017 | Jayadevaprakash et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,851,563 | B2 | 12/2017 | Gao et al. |
| 9,857,591 | B2 | 1/2018 | Welch et al. |
| 9,874,749 | B2 | 1/2018 | Bradski |
| 10,922,887 | B2 | 2/2021 | Robaina et al. |
| 2006/0028436 | A1 | 2/2006 | Armstrong |
| 2007/0081123 | A1 | 4/2007 | Lewis |
| 2009/0190003 | A1 | 7/2009 | Park et al. |
| 2011/0102547 | A1 | 5/2011 | Sul et al. |
| 2012/0127062 | A1 | 5/2012 | Bar-Zeev et al. |
| 2012/0162549 | A1 | 6/2012 | Gao et al. |
| 2012/0230540 | A1* | 9/2012 | Caiman ............... G06V 40/16 382/103 |
| 2012/0274745 | A1 | 11/2012 | Russell |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2013/0278631 | A1 | 10/2013 | Border et al. |
| 2013/0293530 | A1 | 11/2013 | Perez et al. |
| 2014/0035913 | A1 | 2/2014 | Higgins et al. |
| 2014/0039309 | A1 | 2/2014 | Harris et al. |
| 2014/0046291 | A1 | 2/2014 | Harris et al. |
| 2014/0071539 | A1 | 3/2014 | Gao |
| 2014/0160162 | A1 | 6/2014 | Balachandreswaran |
| 2014/0177023 | A1 | 6/2014 | Gao et al. |
| 2014/0218468 | A1 | 8/2014 | Gao et al. |
| 2014/0232749 | A1 | 8/2014 | Park et al. |
| 2014/0267420 | A1 | 9/2014 | Schowengerdt |
| 2014/0306866 | A1 | 10/2014 | Miller et al. |
| 2014/0320531 | A1 | 10/2014 | Elvesjo |
| 2015/0016777 | A1 | 1/2015 | Abovitz et al. |
| 2015/0103096 | A1 | 4/2015 | Gotoda |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0213648 | A1 | 7/2015 | Wu |
| 2015/0222883 | A1 | 8/2015 | Welch |
| 2015/0222884 | A1 | 8/2015 | Cheng |
| 2015/0248235 | A1* | 9/2015 | Offenberg ............. G06F 3/0237 715/773 |
| 2015/0257735 | A1 | 9/2015 | Ball et al. |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0338548 | A1 | 11/2015 | Cortelyou et al. |
| 2015/0346490 | A1 | 12/2015 | TeKolste et al. |
| 2015/0346495 | A1 | 12/2015 | Welch et al. |
| 2016/0004917 | A1 | 1/2016 | Yoshida |
| 2016/0011419 | A1 | 1/2016 | Gao |
| 2016/0026253 | A1 | 1/2016 | Bradski et al. |
| 2016/0124608 | A1 | 5/2016 | Sumner et al. |
| 2016/0140761 | A1 | 5/2016 | Saunders |
| 2016/0189426 | A1 | 6/2016 | Thomas et al. |
| 2016/0270656 | A1 | 9/2016 | Samec et al. |
| 2018/0089876 | A1 | 3/2018 | Akouh |
| 2018/0182173 | A1 | 6/2018 | Robaina et al. |

FOREIGN PATENT DOCUMENTS

| | | |
|---|---|---|
| JP | 5390377 B2 | 1/2014 |
| JP | 2015-125641 A | 7/2015 |
| KR | 10-0542370 | 1/2006 |
| KR | 10-2015-0130555 | 11/2015 |
| KR | 20150130555 | 11/2015 |
| WO | WO 2006/011706 | 2/2006 |
| WO | WO 2013/179427 | 12/2013 |
| WO | WO 2018/111895 | 6/2018 |

OTHER PUBLICATIONS

International Search Report and Written Opinion for PCT Application No. PCT/US2017/065850, dated Apr. 23, 2018.

International Preliminary Report for PCT Application No. PCT/US2017/065850, dated Jun. 18, 2019.

"Fiducial Marker", reviewed Jun. 20, 2016 in 6 pages. URL:https://en.wikipedia.org/wiki/Fiducial_marker.

Aggarwal S., "Principles of Remote Sensing", in *Satellite remote sensing and GIS applications in agricultural meteorology; Proceedings of the Training Workshop Jul. 7-11*, 2003; Sivakumar et al. [Eds.]; pp. 23-38.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Hemmer E. et al., "Exploiting the biological windows: current perspectives on fluorescent ioprobes emitting above 1000 nm", Nanoscale Horizons (Royal Society of Chemistry) Jan. 2016; 1(3):168-184.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Krueger, "Need help finding a vein?" Nursing 2020—LWW Journals. Nursing 2019 37.6 (2007): 39-41. 2007.

Notingher I., "Raman Spectroscopy Cell-based Biosensors", Sensors (Jul. 26, 2007) 7(8):1343-1358.

Tanriverdi and Jacob, "Interacting With Eye Movements in Virtual Environments," Department of Electrical Engineering and Computer Science, Tufts University, Medford, MA—paper/Proc. ACM

(56) References Cited

OTHER PUBLICATIONS

CHI 2000 Human Factors in Computing Systems Conference, pp. 265-272, Addison-Wesley/ACM Press (2000).
Tosk N., "Future Looks Bright For Non-invasive Diagnosis of Skin Cancer; etc." published Nov. 17, 2008 in 3 pages; URL:http://www.prweb.com/releases/2008/11/prweb1614684.htm.
Krueger, "Need help finding a vein?" Nursing 2020—LWW Journals. Nursing 2019 37.6 (2007): 39-41. (12 pages, downloaded May 21, 2020) 2007.

* cited by examiner

3D OBJECT RENDERING USING DETECTED FEATURES

INCORPORATION BY REFERENCE

This application is a continuation application of U.S. application Ser. No. 15/839,654, filed Dec. 12, 2017, entitled "3D OBJECT RENDERING USING DETECTED FEATURES," which claims priority under 35 U.S.C. § 119(e) from U.S. Provisional Application No. 62/433,767, filed Dec. 13, 2016, entitled "3D OBJECT RENDERING USING DETECTED FEATURES," which is hereby incorporated by reference herein in its entirety and for all purposes. This application additionally incorporates by reference the entirety of each of the following patent applications: U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; U.S. application Ser. No. 14/331,218 filed on Jul. 14, 2014; and U.S. application Ser. No. 15/072,290 filed on Mar. 16, 2016.

BACKGROUND

Field

The present disclosure relates to optical devices, including virtual reality and augmented reality imaging and visualization systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

EXAMPLES

1. An augmented reality display system configured to align 3D content with a real object, the system comprising:
   a frame configured to mount on the wearer;
   an augmented reality display attached to the frame and configured to direct images to an eye of the wearer;
   a light source configured to illuminate at least a portion of the object by emitting invisible light;
   a light sensor configured to image said portion of said object illuminated by said light source using said invisible light; and
   processing circuitry configured to determine information regarding the location of the object, the orientation of the object, or both based on one or more characteristics of a feature in the image formed using a reflected portion of the invisible light.

2. The augmented reality display system of Example 1, wherein the feature in the image formed using a reflected portion of the invisible light is invisible to the eye.

3. The augmented reality display system of any of Examples 1-2, wherein the invisible light comprises infrared light.

4. The augmented reality display system of any of Examples 1-3, wherein the invisible light emitted by the light source comprises a beam that forms a spot on said portion of the object.

5. The augmented reality display system of any of Examples 1-3, wherein the invisible light emitted by the light source comprises a light pattern.

6. The augmented reality display system of any of Examples 1-5, wherein said characteristic comprises the location of said feature.

7. The augmented reality display system of any of Examples 1-6, wherein said characteristic comprises the shape of said feature.

8. The augmented reality display system of any of Examples 1-7, wherein said characteristic comprises the orientation of said feature.

9. The augmented reality display system of any of Examples 1-8, further comprising a depth sensor configured to detect a location of a real object in the world.

10. The augmented reality display system of any of Examples 1-9, wherein said processing circuitry is configured to determine a difference between a distribution of the emitted invisible light and a distribution of the reflected portion of the invisible light.

11. The augmented reality display system of Example 10, wherein said processing circuitry is configured to identify a difference signature based on the determined difference.

12. The augmented reality display system of Example 11, wherein said processing circuitry is configured to determine an orientation of the real object based on the location of the real object and a location of the difference signature.

13. The augmented reality display system of Example 12, wherein said processing circuitry is configured to determine a location of the real object based at least in part on a location of the difference signature.

14. The augmented reality display system of any of Examples 1-13, further comprising an eyepiece disposed on the frame, at least a portion of said eyepiece being transparent and disposed at a location in front of the wearer's eye when the wearer wears said display system such that said transparent portion transmits light from the environment in front of the wearer to the wearer's eye to provide a view of the environment in front of the wearer.

15. An augmented reality display system comprising:
a frame configured to mount on the wearer;
an augmented reality display attached to the frame and configured to direct images to an eye of the wearer;
a depth sensor configured to map a surface of a real object within a field of view of the wearer;
a light source configured to project light in at least a first wavelength incident upon the surface of the real object;
a light detector configured to form an image using a portion of the light reflected by the surface of the real object; and
processing circuitry configured to determine a light difference marker based at least in part on the reflected portion of the light pattern and render a virtual object at a fixed displacement relative to the light difference marker.

16. The augmented reality display system of Example 15, wherein rendering the virtual object at a fixed displacement relative to the light difference marker comprises:
receiving an initial location for rendering the virtual object relative to the real object at an initial time;
determining the fixed displacement based on a distance between the initial location and the light difference marker;
detecting a subsequent location of the light difference marker at a time subsequent to the initial time; and
rendering the virtual object at the fixed displacement relative to the detected subsequent location of the light difference marker.

17. The augmented reality display system of Example 15 or 16, further comprising an eyepiece disposed on the frame, at least a portion of said eyepiece being transparent and disposed at a location in front of the wearer's eye when the wearer wears said display system such that said transparent portion transmits light from the environment in front of the wearer to the wearer's eye to provide a view of the environment in front of the wearer.

18. An augmented reality display system configured to align 3D content with a real object, the system comprising:
a frame configured to mount on the wearer;
an augmented reality display attached to the frame and configured to direct images to an eye of the wearer;
a depth sensor configured to map a surface of a real object within a field of view of the wearer;
a light source configured to illuminate at least a portion of the object by emitting light;
a light sensor configured to image said portion of said object illuminated by said light source using said emitted light; and
processing circuitry configured to determine information regarding the location of the real object, the orientation of the real object, or both based on one or more characteristics of a feature in said image of said object.

19. The augmented reality display system of Example 18, wherein the light emitted by the light source comprises a beam that forms a spot on said portion of the object.

20. The augmented reality display system of Example 18, wherein the light emitted by the light source comprises a light pattern.

21. The augmented reality display system of any of Examples 18-20, wherein said characteristic comprises the location of said feature.

22. The augmented reality display system of any of Examples 18-21, wherein said characteristic comprises the shape of said feature.

23. The augmented reality display system of any of Examples 18-22, wherein said characteristic comprises the orientation of said feature.

24. The augmented reality display system of any of Examples 18-23, wherein said processing circuitry is configured to determine a difference between a distribution of the emitted light and a distribution of said emitted light reflected from said object.

25. The augmented reality display system of Example 24, wherein said processing circuitry is configured to identify a light difference marker based on the determined difference.

26. The augmented reality display system of Example 25, wherein said processing circuitry is configured to determine an orientation of the real object based on the location of the real object and a location of the light difference marker.

27. The augmented reality display system of Examples 25 or 26, wherein said processing circuitry is configured to determine a location of the real object based at least in part on a location of the light difference marker.

28. The augmented reality display system of any of Examples 18-27, wherein said depth sensor comprise a laser or ultrasound range finder.

29. The augmented reality display system of any of Examples 18-28, wherein said depth sensor comprises a camera.

30. The augmented reality display system of any of Examples 18-29, further comprising an eyepiece disposed on the frame, at least a portion of said eyepiece being transparent and disposed at a location in front of the wearer's eye when the wearer wears said display system such that said transparent portion transmits light from the environment in front of the wearer to the wearer's eye to provide a view of the environment in front of the wearer.

31. The augmented reality display system of any of the Examples above, wherein said display is configured to render image content as if different image content is located at different depths.

32. The augmented reality display system of Example 31, wherein said display includes multiple powered optical elements having different optical power to provide for said different depths.

DETAILED DESCRIPTION

Figure 1:
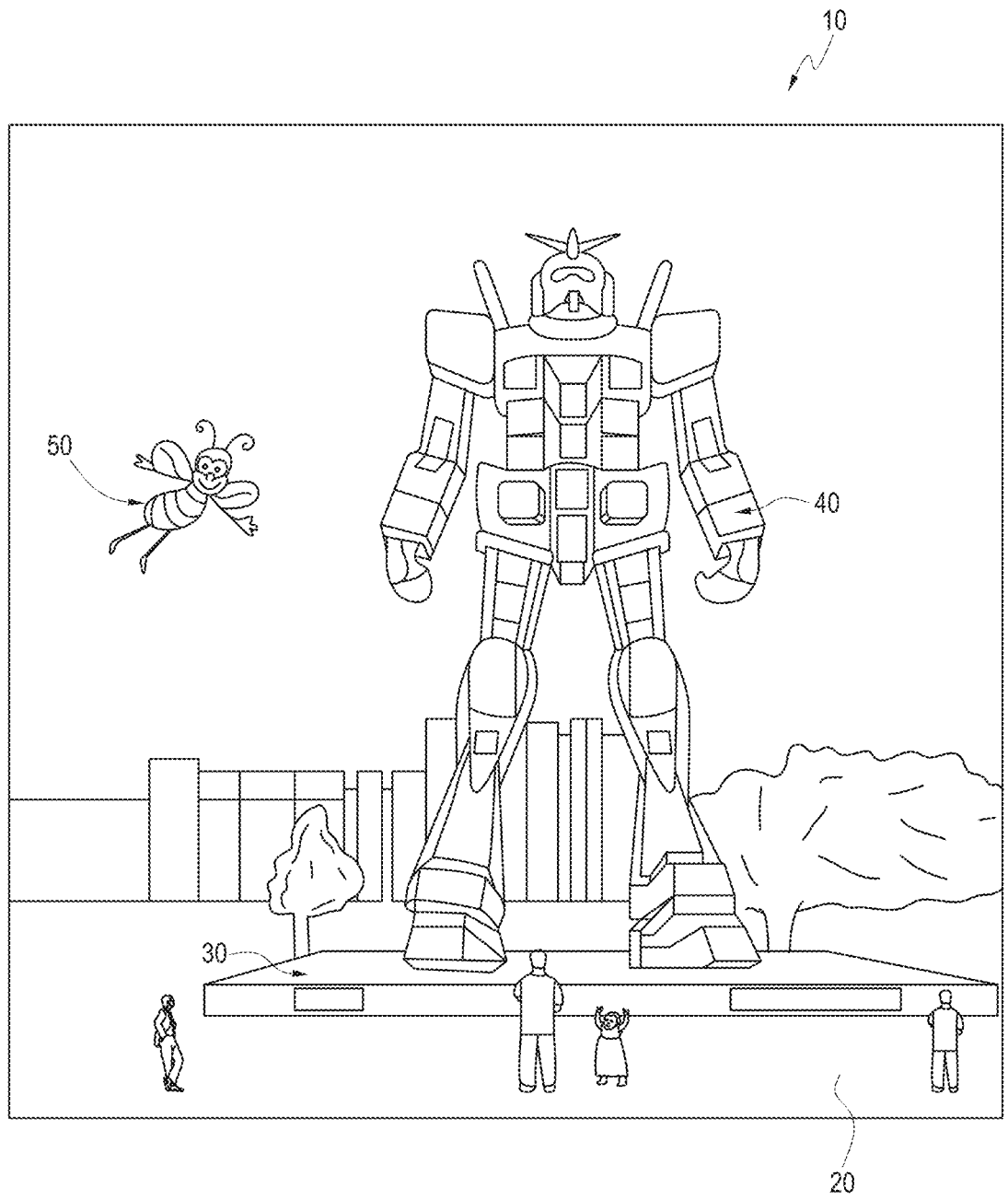
FIG. 1 illustrates a user's view of augmented reality (AR) through an AR device.

Reference will now be made to the figures, in which like reference numerals refer to like parts throughout. It will be appreciated that embodiments disclosed herein include optical systems, including display systems, generally. In some embodiments, the display systems are wearable, which may advantageously provide a more immersive VR or AR experience. For example, displays containing one or more waveguides (e.g., a stack of waveguides) may be configured to be worn positioned in front of the eyes of a user, or viewer. In some embodiments, two stacks of waveguides, one for each eye of a viewer, may be utilized to provide different images to each eye.

Example Display Systems

Figure 2:
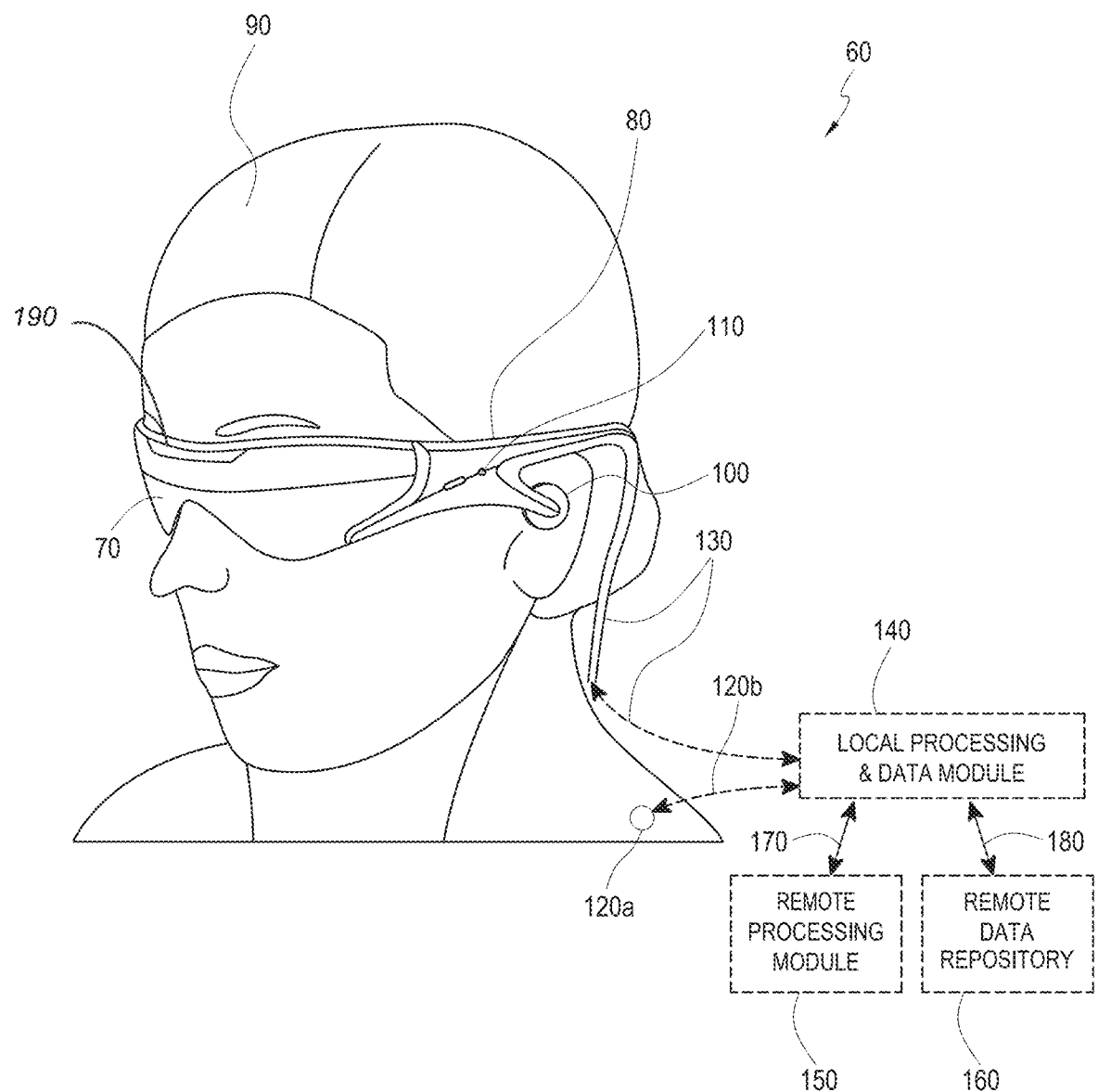
FIG. 2 illustrates an example of a wearable display system.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, is positioned adjacent the other ear canal of the user to provide stereo/shapeable sound control). In some embodiments, the display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing the physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
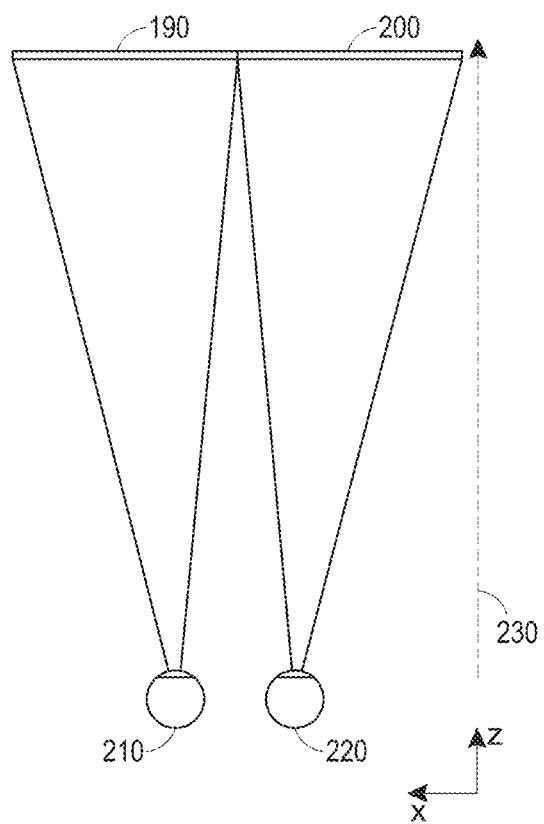
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentation of a scene, but with the eyes viewing all the image information at a single accommodated state, and work against the "accommodation-vergence reflex." Display systems that provide a better match between accommodation and vergence may form more realistic and comfortable simulations of three-dimensional imagery contributing to increased duration of wear and in turn compliance to diagnostic and therapy protocols.

Figure 4:
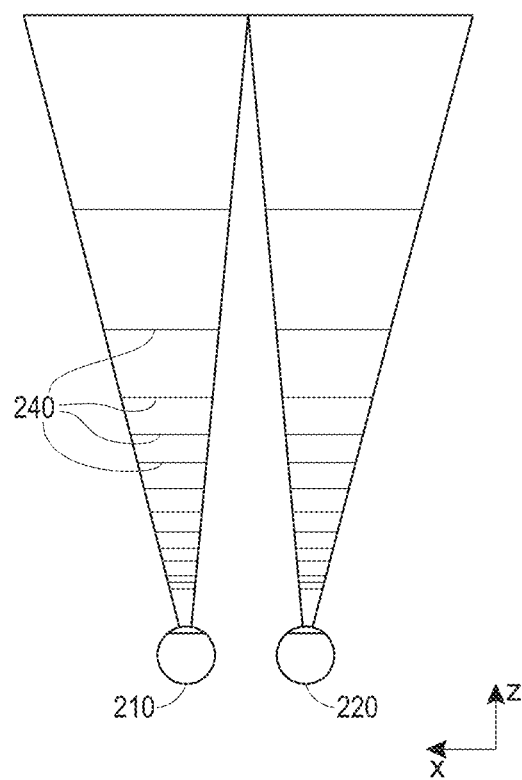
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
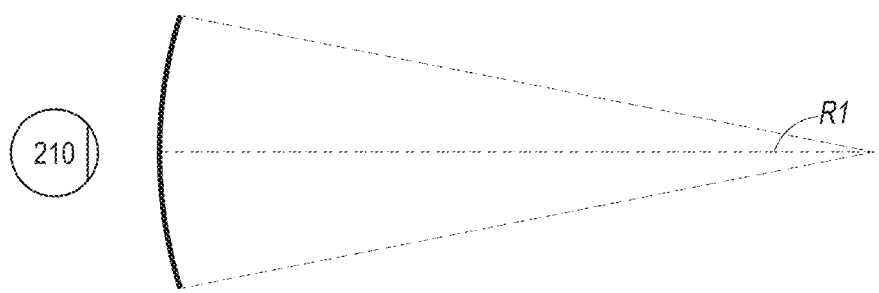
FIGS. 5A-5C illustrate relationships between radius of curvature and focal radius.
Figure 5B:
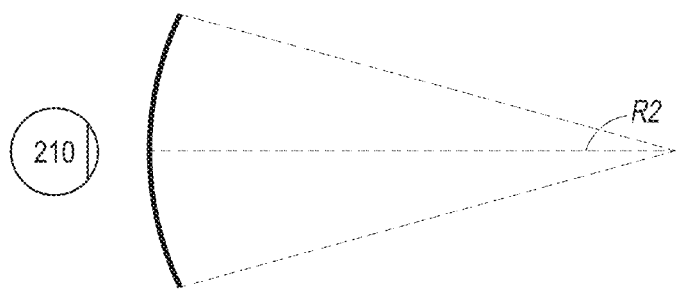
Figure 5C:
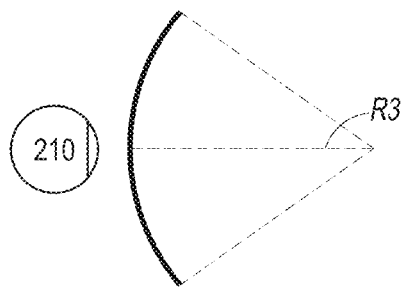

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
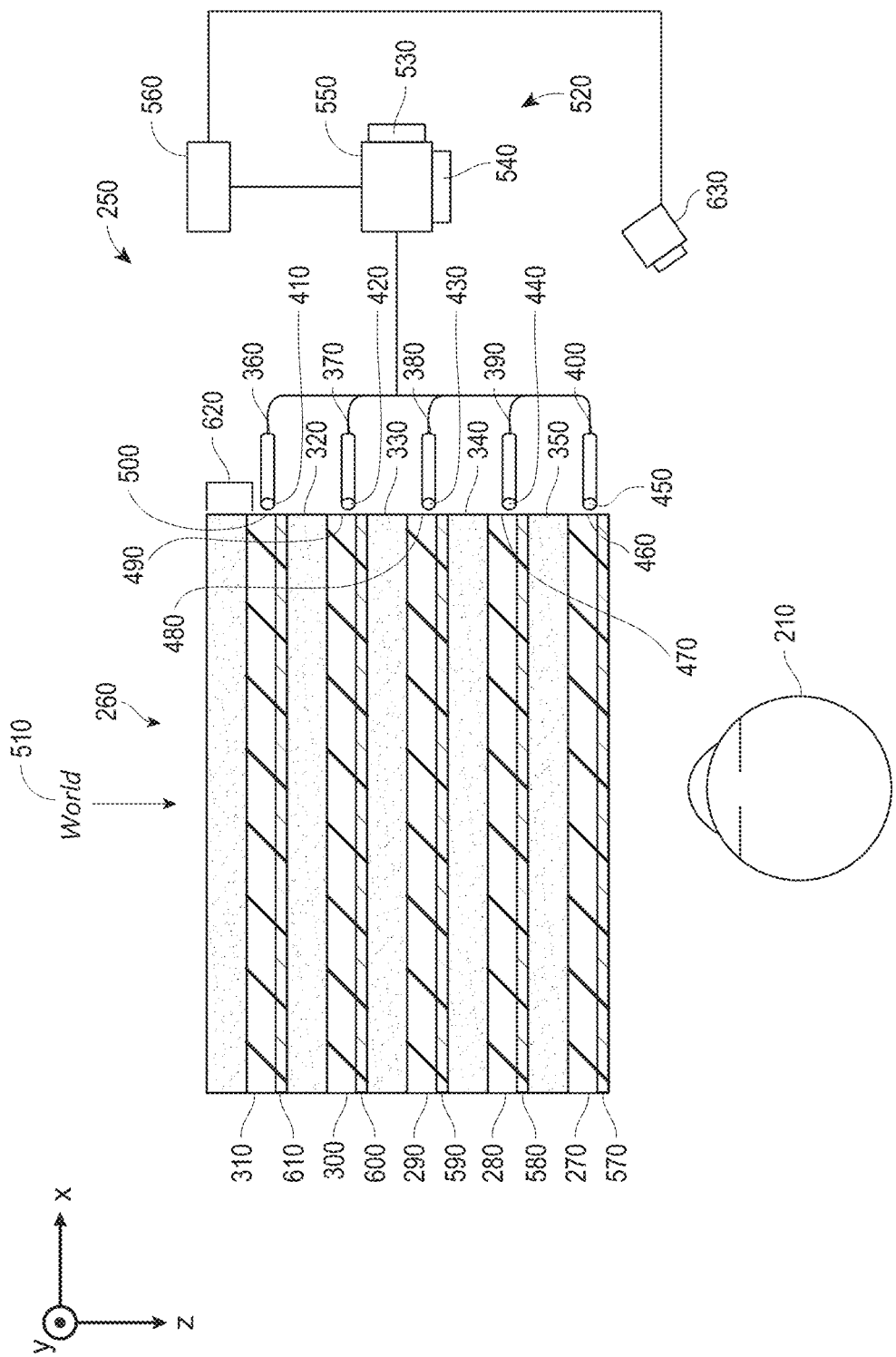
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310. Examples of spatial light modulators include liquid crystal displays (LCD) including a liquid crystal on silicon (LCOS) displays.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630 to make various determinations regarding, e.g., the physiological state of the user, as discussed herein. It will be appreciated that information regarding the physiological state of user may be used to determine the behavioral or emotional state of the user. Examples of such information include movements of the user and/or facial expressions of the user. The behavioral or emotional state of the user may then be triangulated with collected environmental and/or virtual content data so as to determine relationships between the behavioral or emotional state, physiological state, and environmental or virtual content data. In some embodiments, one camera assembly 630 may be utilized for each eye, to separately monitor each eye.

Figure 7:
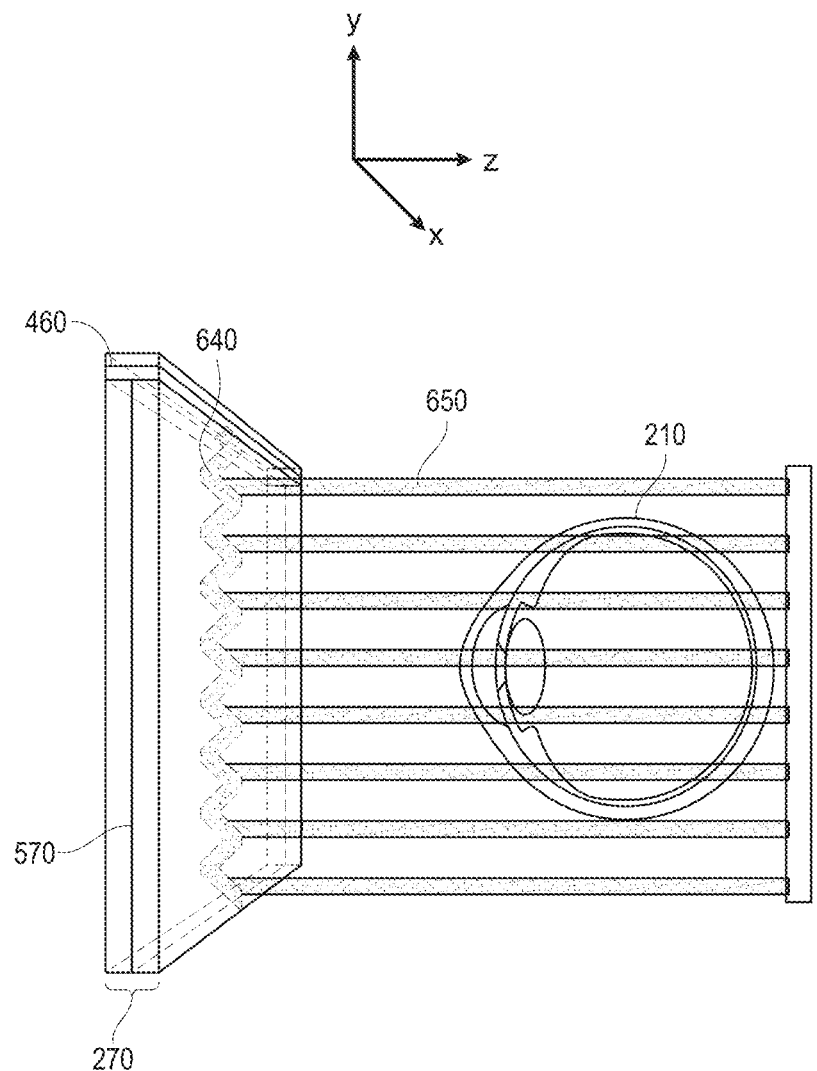
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
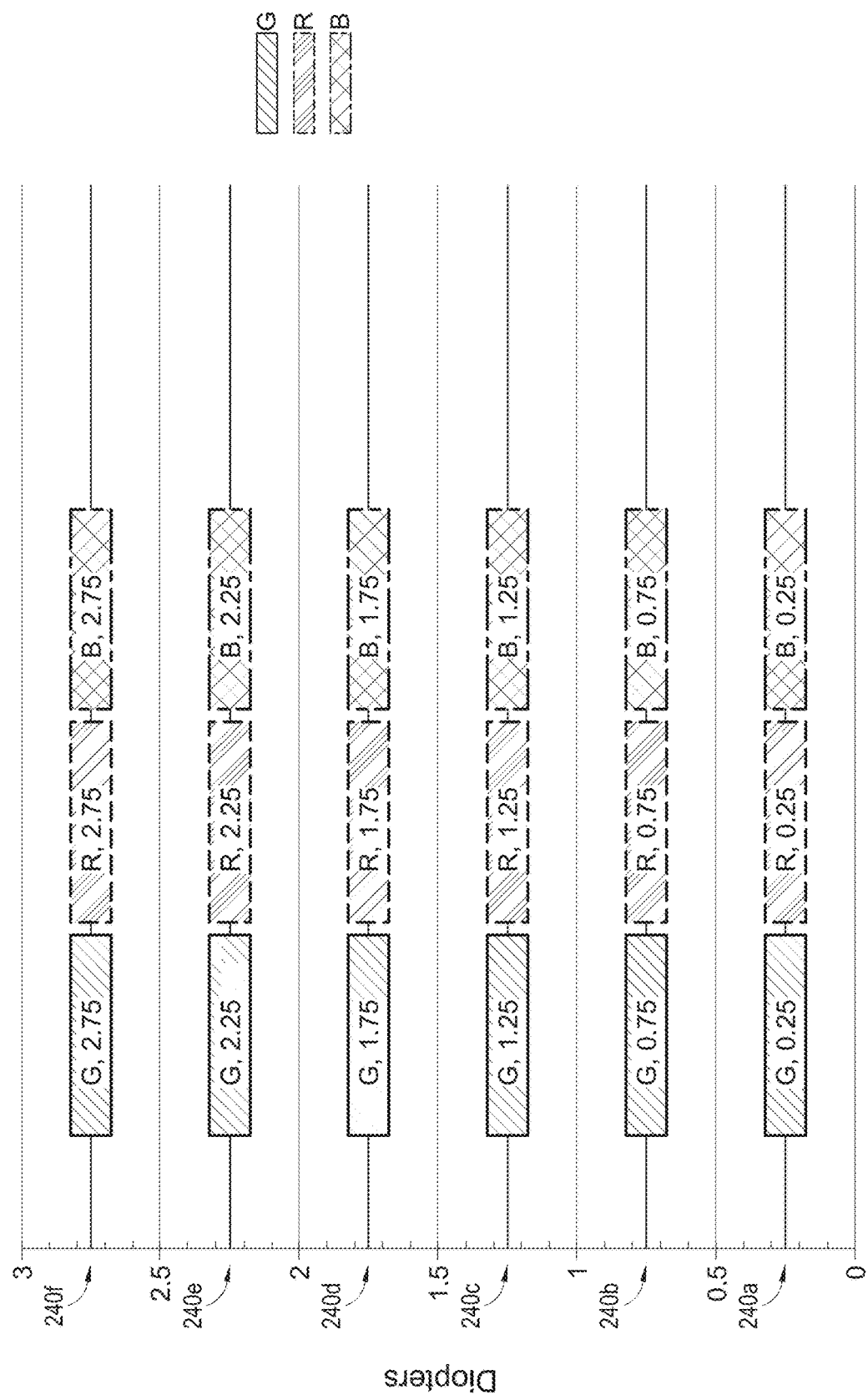
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (l/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue. In some embodiments, features 320, 330, 340, and 350 may be active or passive optical filters configured to block or selectively light from the ambient environment to the viewer's eyes.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
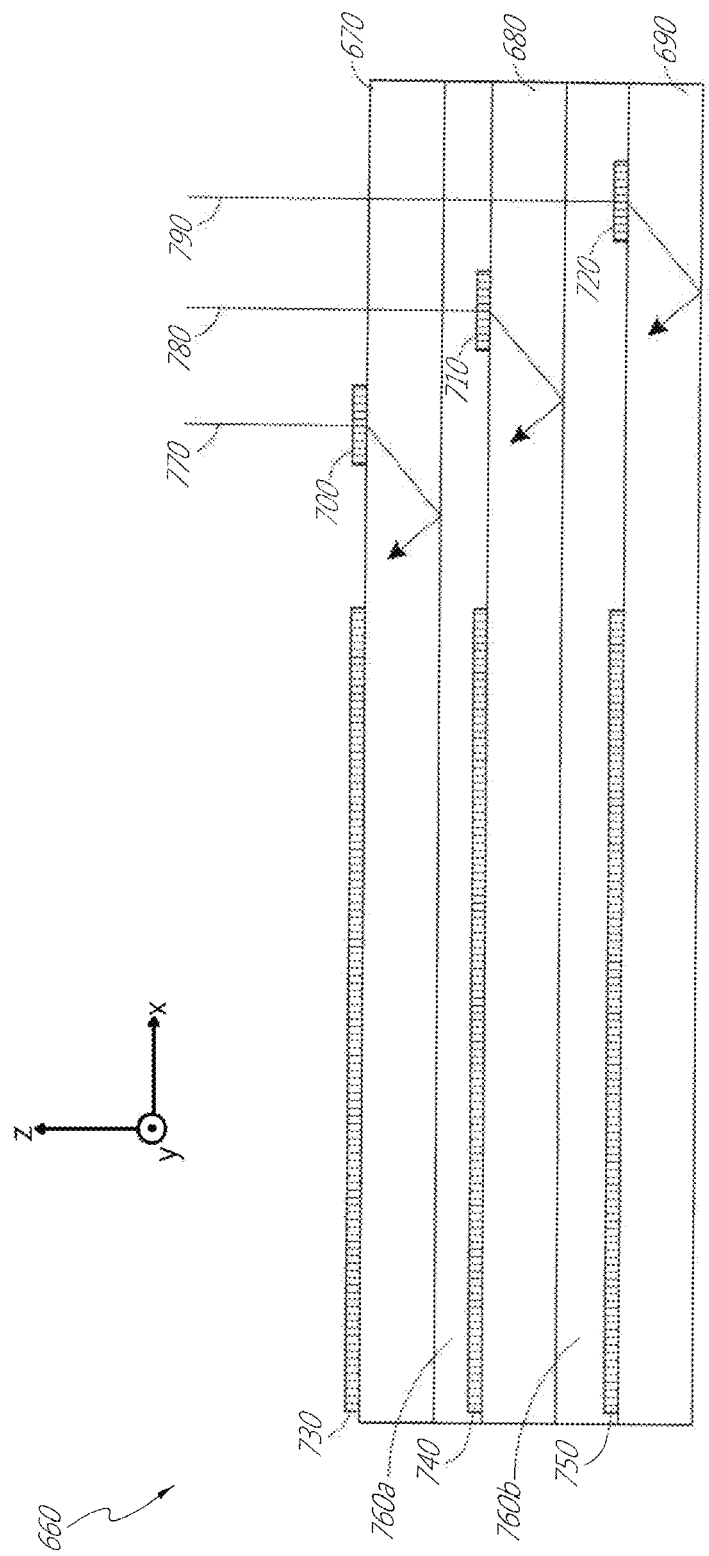
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate TIR of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. Light rays 770, 780, 790 may also be laterally displaced to different locations corresponding to the lateral locations of in-coupling optical elements 700, 710, 720. The in-coupling optical elements 700, 710, 720 each deflect the incident light such that the light propagates through a respective one of the waveguides 670, 680, 690 by TIR.

For example, in-coupling optical element 700 may be configured to deflect ray 770, which has a first wavelength or range of wavelengths. Similarly, the transmitted ray 780 impinges on and is deflected by the in-coupling optical element 710, which is configured to deflect light of a second wavelength or range of wavelengths. Likewise, the ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR, and thus be guided therein. For example, deflection of light rays 770, 780, 790 may be caused by one or more reflective, diffractive, and/or holographic optical elements, such as a holographic, diffractive, and/or reflective turning feature, reflector, or mirror. Deflection may in some cases be caused by microstructure such as diffractive features in one or more gratings, and/or holographic and/or diffractive optical elements configured to turn or redirect light, for example, so as to be guided with the light guide. The light rays 770, 780, 790 propagate through the respective waveguide 670, 680, 690 by TIR, being guided therein until impinging on the waveguide's corresponding light distributing elements 730, 740, 750.

Figure 9B:
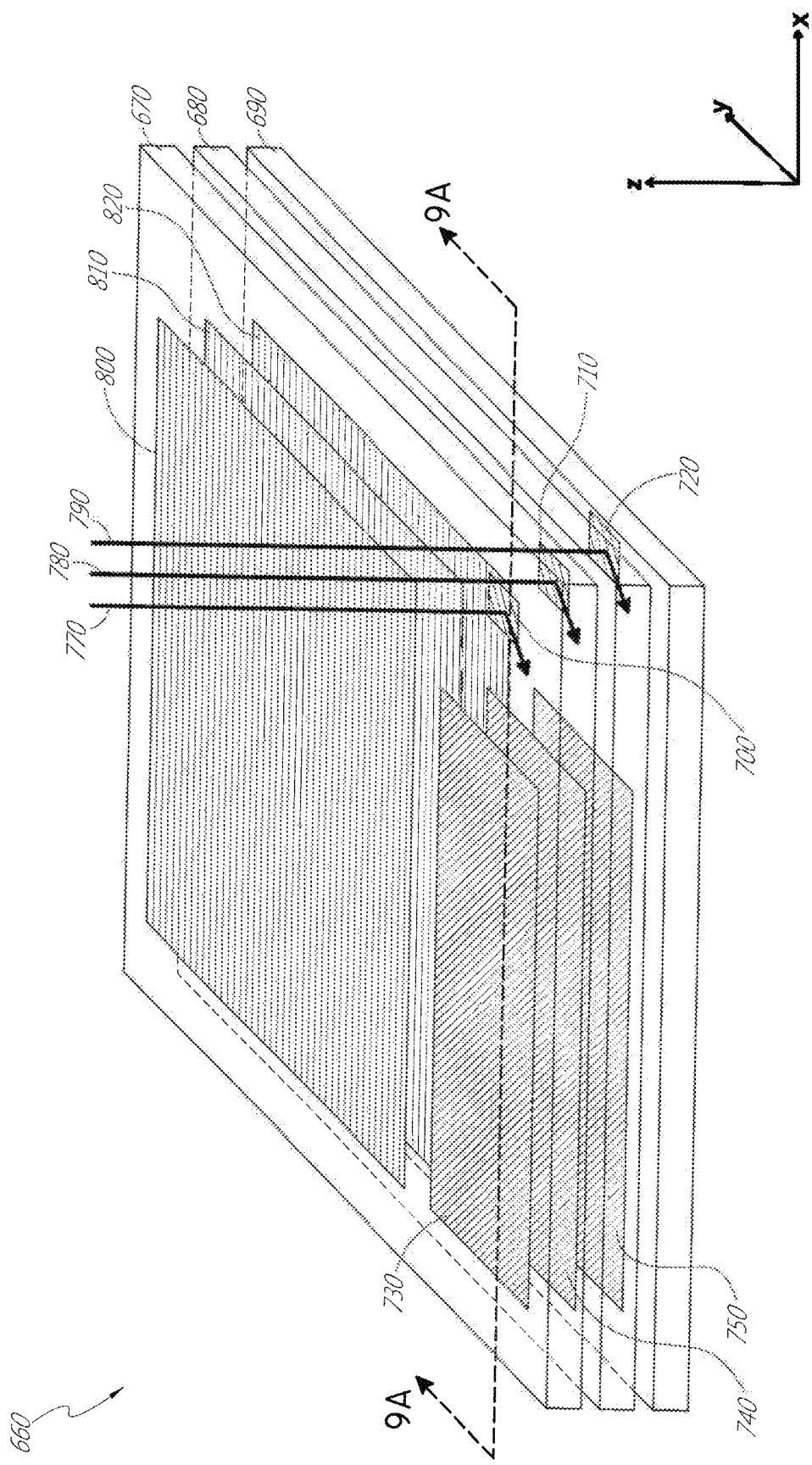
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR and are guided within the waveguides 670, 680, 690, respectively. The guided light rays 770, 780, 790 then impinge on the light distributing elements 730, 740, 750, respectively. The light distributing elements 730, 740, 750 may comprise one or more reflective, diffractive, and/or holographic optical elements, such as a holographic, diffractive, and/or reflective turning feature, reflector, or mirror. Deflection may in some cases be caused by microstructure such as diffractive features in one or more gratings, and/or holographic and/or diffractive optical elements configured to turn or redirect light, for example, so as to be guided with the light guide. The light rays 770, 780, 790 propagate through the respective waveguide 670, 680, 690 by TIR being guided therein until impinging on the waveguide's corresponding light distributing elements 730, 740, 750, where they are deflected, however, in a manner so that the light rays 770, 780, 790 are still guided within the waveguide. The light distributing elements 730, 740, 750 deflect the light rays 770, 780, 790 so that they propagate towards the out-coupling optical elements 800, 810, 820, respectively.

The out-coupling optical elements 800, 810, 820 are configured to direct light guided within the waveguide, e.g., the light rays 770, 780, 790, out of the waveguide and toward the viewer's eye. The out-coupling optical elements 800, 810, 820 may be configured therefore to deflect and redirect the light guided within the waveguide, e.g., light rays 770, 780, 790, at a more normal angle with respect to the surfaces of the waveguide so as to reduce the effects of total internal reflection (TIR) such that light is not guided within the waveguide but instead exits therefrom. Moreover, these out-coupling optical elements 800, 810, 820 may be configured to deflect and redirect this this light, e.g., light rays 770, 780, 790, toward the viewer's eye. Accordingly, the out-coupling optical elements 800, 810, 820 may comprise one or more reflective, diffractive, and/or holographic optical elements, such as a holographic, diffractive, and/or reflective turning feature, reflector, or mirror. Deflection may in some cases be caused by microstructure such as diffractive features in one or more gratings, and/or holographic and/or diffractive optical elements configured to turn or redirect light, for example, so as to be guided with the light guide. The optical elements 800, 810, 820 may be configured to reflect, deflect, and/or diffract the light rays 770, 780, 790 so that they propagate out of the waveguide toward the users eye.

In some embodiments, the light distributing elements 730, 740, 750 are orthogonal pupil expanders (OPE's). In some embodiments, the OPE's both deflect or distribute light to the out-coupling optical elements 800, 810, 820 and also replicate the beam or beams to form a larger number of beams which propagate to the out-coupling optical elements. As a beam travels along the OPE's, a portion of the beam may be split from the beam and travel in a direction orthogonal to the beam, in the direction of out-coupling optical elements 800, 810, 820. Orthogonal splitting of the beam in the OPE's may occur repeatedly along the path of the beam through the OPE's. For example, OPE's may include a grating having an increasing reflectance along the beam path such that a series of substantially uniform beamlets are produced from a single beam. In some embodiments, the out-coupling optical elements 800, 810, 820 are exit pupils (EP's) or exit pupil expanders (EPE's) that direct light in a viewer's eye 210 (FIG. 7). The OPE's may be configured to increase the dimensions of the eye box, for example, along the x direction, and the EPE's may be to increase the eye box in an axis crossing, for example, orthogonal to, the axis of the OPE's, e.g., along the y direction.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EPE's) 800, 810, 820 for each component color. The waveguides 670, 680, 690 may be stacked with an air gap and/or cladding layer between each one. The in-coupling optical elements 700, 710, 720 redirect or deflect incident light (with different in-coupling optical elements receiving light of different wavelengths) into its respective waveguide. The light then propagates at an angle which will result in TIR within the respective waveguide 670, 680, 690, and the light is guided therein. In the example shown, light ray 770 (e.g., blue light) is deflected by the first in-coupling optical element 700, and then continues to propagate within the waveguide being guided therein, interacting with the light distributing element (e.g., OPE's) 730 where it is replicated into a plurality of rays propagating to the out-coupling optical element (e.g., EPE's) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPE's) 740 where it is replicated into a plurality of rays propagating to the out-coupling optical element (e.g., EPE's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPE's) 750 by TIR, where it is replicated into a plurality of rays propagating to to the out-coupling optical element (e.g., EPE's) 820 by TIR. The out-coupling optical element 820 then finally further replicates and out-couples the light rays 790 to the viewer, who also receives the out-coupled light from the other waveguides 670, 680.

Figure 9C:
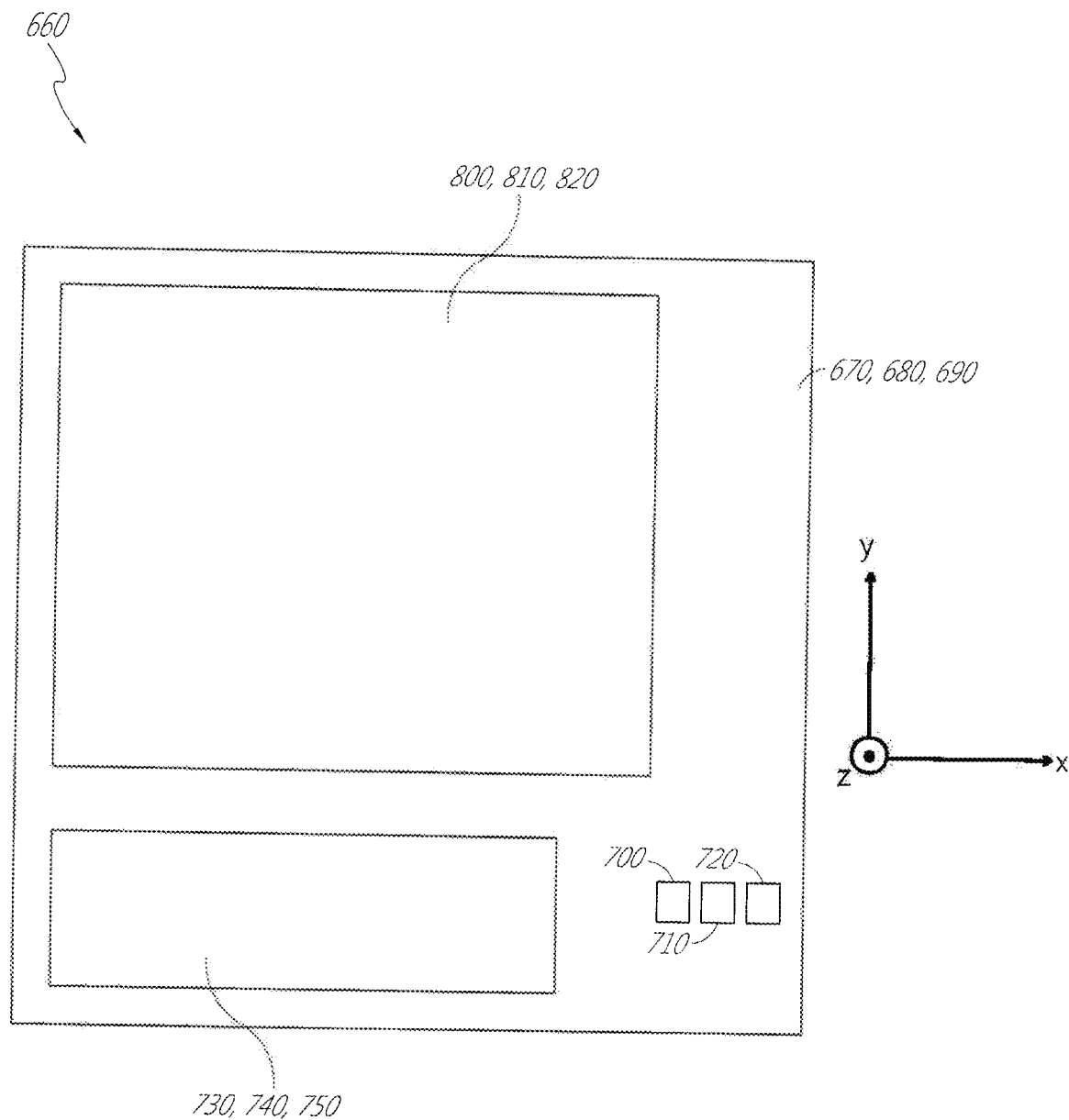
FIG. 9C illustrates a top-down plan view of an example of the plurality of stacked waveguides of FIGS. 9A and 9B.

FIG. 9C illustrates a top-down plan view (or front view) of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned (e.g., along the x and y directions). However, as discussed herein, the in-coupling optical elements 700, 710, 720 are not vertically aligned; rather, the in-coupling optical elements are preferably non-overlapping (e.g., laterally spaced apart along the x direction as seen in the top-down view of front view in this example). Shifting in other directions, such as the y direction, can also be employed. This non-overlapping spatial arrangement facilitates the injection of light from different resources such as different light sources and/or displays into different waveguides on a one-to-one basis, thereby allowing a specific light source to be uniquely coupled to a specific waveguide. In some embodiments, arrangements including non-overlapping laterally-separated in-coupling optical elements may be referred to as a shifted pupil system, and the in-coupling optical elements within these arrangements may correspond to sub-pupils.

In addition to coupling light out of the waveguides, the out-coupling optical elements 800, 810, 820 may cause the light to be collimated or to diverge as if the light originated from an object at a far distance or a closer distance, depth, or depth plane. Collimated light, for example, is consistent with light from an object that is far from the view. Increasing diverging light is consistent with light from an object that is closer, for example, 5-10 feet or 1-3 feet, in front of the viewer. The natural lens of the eye will accommodate when viewing an object closer to the eye and the brain may sense this accommodation, which also then serves as a depth cue. Likewise, by causing the light to be diverging by a certain amount, the eye will accommodate and perceive the object to be at closer distance. Accordingly, the out-coupling optical elements 800, 810, 820 can be configured to cause the light to be collimated or to diverge as if the light emanated from a far or close distance, depth, or depth plane. To do so, the out-coupling optical elements 800, 810, 820 may include optical power. For example, the out-coupling optical elements 800, 810, 820, may include holographic, diffractive, and/or reflective optical elements that in addition to deflecting or re-directing the light out of the waveguides, these holographic, diffractive, and/or reflective optical elements may further include optical power to cause the light to be collimated or diverging. The out-coupling optical elements 800, 810, 820 may in the alternative or in addition include refracting surfaces that include optical power that cause the light to be collimated or diverging. The out-coupling optical elements 800, 810, 820 may therefore comprise, for example, in addition to diffractive or holographic turning features, a refractive surface the provides optical power. Such refractive surface may also be included in addition to the out-coupling optical elements 800, 810, 820, for example, on top of the out-coupling optical elements 800, 810, 820. In certain embodiments, for example, optical elements, for example, diffractive optical element, holographic optical elements, refractive lens surfaces, or other structures may be disposed with respect to the out-coupling optical elements 800, 810, 820 to provide the optical power cause the collimation or divergence of the light. A layer with optical power such as a layer with a refractive surface or a layer with diffractive and/or holographic features may for example be disposed with respect to the out-coupling optical elements 800, 810, 820 to additionally provide optical power. A combination of contributions from both the out-coupling optical elements 800, 810, 820 having optical power and an additional layer with optical power such as a layer with a refractive surface or a layer with diffractive and/or holographic features is also possible.

Example 3D Content Rendering Systems and Methods

In various implementations, the augmented reality systems and methods described herein can be used to render virtual content, such as virtual objects, that appear to interact with real objects in the world around the wearer. In some embodiments, a depth sensor may be used to map the world around the wearer and/or body parts of the wearer, and the augmented reality system can render 3D virtual content, such as an object or graphic, onto a real object detected in the world. In one example, the virtual content can be a virtual watch rendered on the wrist of the wearer. Thus, while the wearer of the head mounted augmented reality device is not wearing a real watch, the virtual watch displayed to the wearer through a display of the device can appear to be located on the wearer's wrist. In another example, the virtual content can be a graphic design for display on a real object, such as a logo or advertising content to be displayed on the side of a coffee cup.

The location of the real object associated with the virtual content can be tracked, such as by a depth sensor. The virtual content can be displayed in a location determined based on the location of the real object. For example, as a wearer moves the wrist associated with a virtual watch, the device can change the location of the virtual watch as displayed to the wearer such that the watch continues to appear to be on the wearer's wrist. However, existing depth sensors may be unable to detect the orientation of the real object associated with the virtual content. For example, if the wearer's wrist or the coffee cup described above rotates, the information from the depth sensor may be insufficient to allow the system to distinguish different symmetric or nearly symmetric orientations of the real object. Thus, while a depth sensor can detect the location of the real object, the systems described herein may use secondary tracking of features (sometimes referred to herein as landmarks or fiducial features) of real objects to identify a more precise location and/or orientation information that the depth sensors cannot detect.

Various systems and methods described herein may allow an augmented reality display system to track the location and the orientation of objects based on light reflective and/or scattering properties of visible or invisible markers at or near the surface of the object. In some example embodiments, an augmented reality display system can track the position of the object using a depth sensor, identify a feature at the surface of the object, and determine an orientation of the object based on the location of the feature relative to the object. The feature (sometimes referred to herein as a fiducial feature or fiducial) may be a preexisting feature of the object, such that the orientation of the object can be tracked without separately applying an additional marker for the purpose of orientation tracking. As will be described in greater detail, the feature or fiducial may be detected using visible light or invisible light, such as in the infrared or ultraviolet range. The fiducial or feature may be a background feature, such as a birthmark on a wrist or a seam in a coffee cup, or an invisible feature, such as one or more veins on a wrist, arm, or hand.

Figure 10:
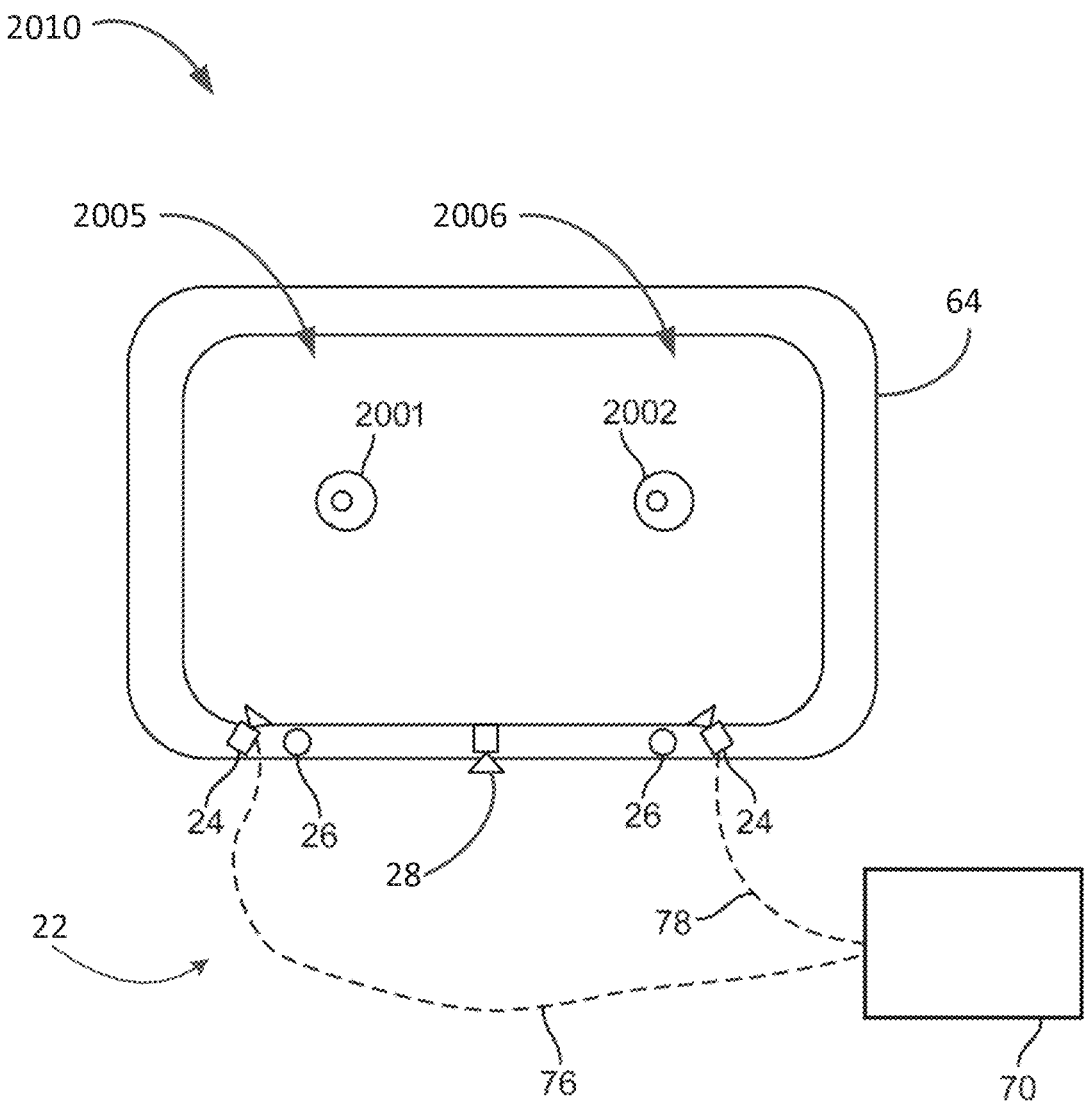
FIG. 10 schematically illustrates an augmented reality display system configured to track the orientation of objects in the world using markers.

Reference will now be made to FIG. 10, which shows a schematic view of various components of an example augmented reality display system 2010 configured to track the location and orientation of real objects as described herein. In some embodiments, the augmented reality display system may be a mixed reality display system. As shown, the augmented reality display system 2010 includes a frame 64 at least partially enclosing left and right waveguide stacks 2005, 2006 configured to deliver augmented reality content to the left and right eyes 2001, 2002 of a wearer of the augmented reality display system 2010. The system further includes a depth sensor 28, light sources 26, and light detectors 24. A tracking system 22 can include a processing module 70 which can control and/or analyze data received from the depth sensor 28, light detectors 24, and/or light sources 26. Depth sensor 28, light detectors 24, and/or light sources 26 can communicate with the processing module 70 through data links 76, 78.

Depth sensor 28 can be configured to detect the shape and location of various objects in the world around the wearer. For example, objects detected by the depth sensor 28 can include walls, furniture, and other items in a room surrounding the wearer, other people or animals in the vicinity of the wearer, outdoor objects such as trees, bushes, automobiles, buildings, and the like, and/or parts of the wearer's body, such as arms, hands, legs and feet. In various embodiments, the depth sensor may be effective at mapping objects at a range of distances between 0.5 meters and 4 meters from the wearer, 1 meter to 3 meters, up to 5 meters, or any other range. The depth sensor can be an optical depth sensor configured to determine depth using infrared light, visible light, or the like. In various embodiments, the depth sensor may include one or more of a laser source, a laser rangefinder, a camera, an ultrasonic range finder, or other distance sensing, imaging and/or mapping devices.

Light detectors 24 can be configured to detect one or more of infrared light, visible light, ultraviolet light, or other range of electromagnetic radiation. Similarly, light sources 26 may be configured to emit one or more of infrared light, visible light, ultraviolet light, or other range of electromagnetic radiation. In some embodiments, at least a portion of the spectrum emitted by the light sources 26 will be detectable by light detectors 24. In some designs, light sources 26 can be mounted on a gimbal or other movable mounting such that the direction of the emitted radiation can be controlled independent of the orientation of the augmented reality display device 2010. Light detectors 24 can be imaging devices, such as cameras, configured to obtain images of light in at least a portion of the wearer's field of view. In various embodiments, each light detector 24 can be a camera and may comprise a two-dimensional array of light sensors. In some example embodiments, light sources 26 are configured to emit infrared light within a specified wavelength range, and light detectors 24 comprise infrared sensors or infrared light detectors configured to obtain an infrared image using the infrared light reflected by an object within the field of view of the light detectors 24.

In some cases, features not prominent in visible light create discernable features when illuminated with invisible light such as infrared light or ultraviolet light. Veins, for example, that may not be as resolvable to the eye may be clearly resolvable by an infrared camera upon infrared illumination. Such veins may be used as fiducials to identify and track the movement of the object, its translation and/or changes in orientation. Accordingly, illuminating the object with light such as invisible light may cause otherwise invisible features to be detected by cameras or imaging sensors. Movement of these features, which may be referred to as fiducials (or the difference signature as described more fully below), may permit movement of the object to be tracked, for example, so that placement of virtual content with respect to the moving object can be properly placed. Although veins are used as one example, other features may be observable with illumination such as infrared illumination using infrared detectors. For example, other features of the skin may reflect or absorb IR light (or UV light) so as to create a feature, marker or fiducial, that can be tracked with a camera sensitive to the suitable wavelength(s) (e.g., an IR sensor), so as to track the movement of the object, including rotation or change in orientation of the object. With the movement and change in orientation of the object known, the virtual content can be accurately positioned and oriented. Such virtual content, which is designed to follow the object or to have a fixed location and/or orientation with respect to the object, can be appropriately rendered. Similarly, the proper perspectives of the virtual content can be provided. Although infrared and ultraviolet light have been discussed in the examples above, other wavelengths of light or electromagnetic radiation, both visible and invisible, can be used.

In some cases, the illumination may comprise a pattern, such as a grid or array. Additionally, the images of the pattern projected onto the surface may be compared to the emitted pattern of light by the processing module 70 to determine a difference between the emitted and reflected light. Likewise, the processing module 70 can be configured to identify a difference that is locally unique within the image. A locally unique difference may be caused by a portion of the real object having a reflectivity different from the surrounding area. For example, a birthmark, mole, vein, scar tissue, or other structure of an arm or hand may have different a reflectance different from the reflectance of surrounding tissue in the imaged wavelength range (e.g., infrared or UV). Thus, if a region of scar tissue is present in the area that is irradiated and imaged, the light difference between the emitted and reflected radiation distributions can include an anomalous region in the shape of the scar tissue region. Such features, referred to herein as the difference signature, can be used to track the object so that virtual content can be properly located and oriented with respect to the object.

Figure 11:
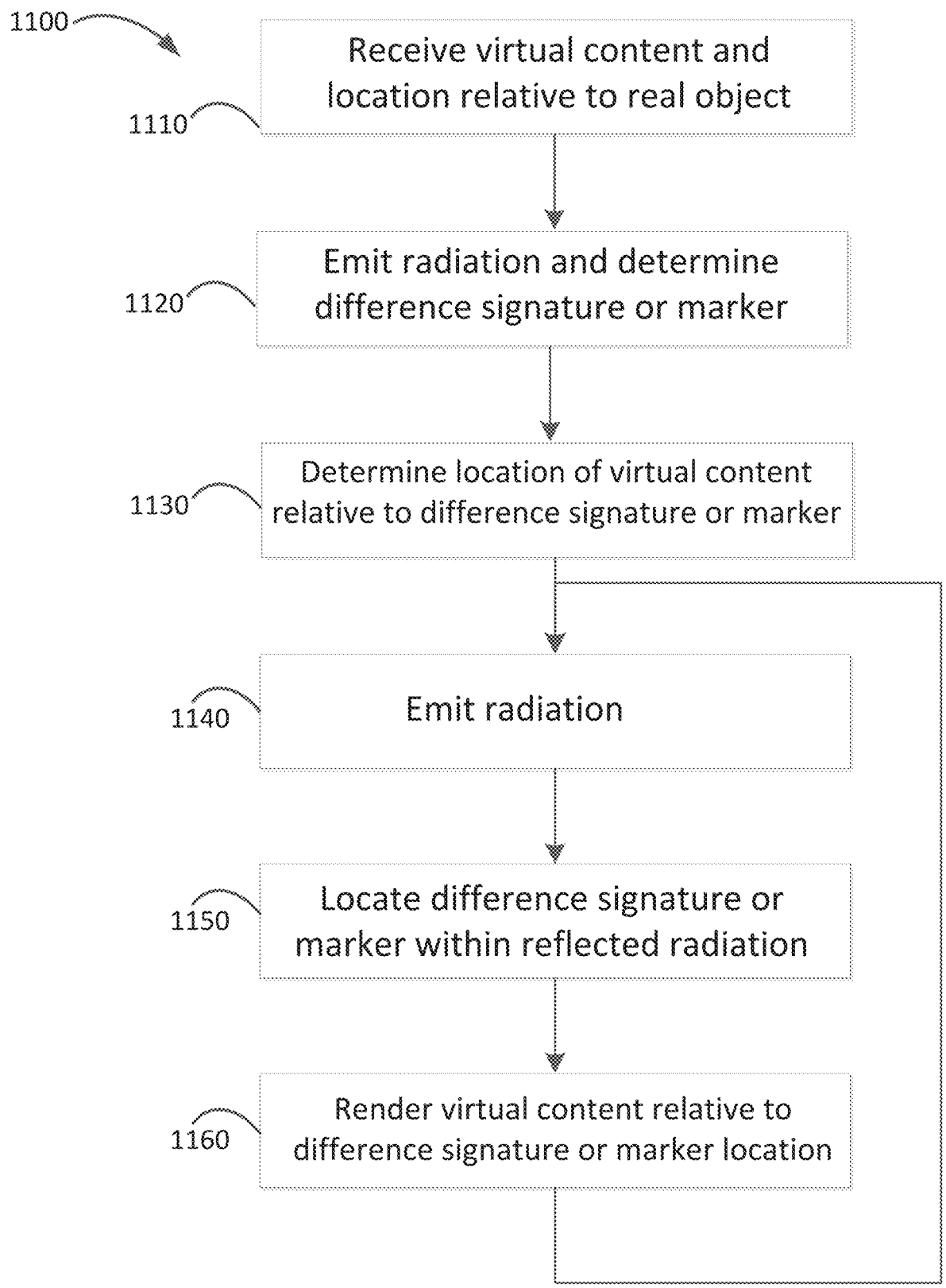
FIG. 11 illustrates an example method of tracking the orientation of an object in the world using markers.

Referring jointly to FIGS. 10 and 11, an example method 1100 of tracking the location and/or orientation of a 3D object using detected features will now be described. The method 1100 may be implemented by any of the systems described herein, such as the wearable augmented reality display systems 60, 2010 depicted in FIGS. 2 and 10. The method 1100 begins at block 1110, where virtual content is received. In one example, the virtual content can be a 3D rendering of a watch, which may function as a virtual watch visible to the wearer of the augmented reality display system 2010. The system 2010 also receives a location of the virtual content relative to a detected real object. For example, the system 2010 may detect the wearer's wrist using depth sensor 28, either automatically or based on an indication by the wearer. A location for the virtual watch may be determined automatically or may be indicated by the wearer, such as by a gesture or using any suitable input device. For example, the wearer may select a position of the virtual watch such that the virtual watch appears to be disposed around the wearer's wrist like a real-world wristwatch. In another example, the virtual content may be a virtual name tag or item identifier, an advertising graphic to be displayed on a real object such as a coffee cup, or any other type of virtual content intended to behave as though affixed to a real object. Once a desired location of the virtual content is determined relative to the real object, the relative location may be selected, registered, or otherwise finalized. After the virtual content and its location relative to a real object are received, the method 1100 continues to block 1120.

At block 1120, the system 2010 emits a radiation pattern and determines a difference between the images of the pattern projected on the object. This difference may depend on and be indicative of the structural features of the real object. The difference may, for example, be indicative of variations of absorption, reflectivity, and/or scattering due to structural variations of the object. This difference may be used as a fiducial, difference signature or markers to track movement and/or changes in orientation. A radiation pattern may be emitted by the light sources 26, a light pattern, such as a textured light field, a grid, or a series of dots, crosses, circles, (e.g. concentric circles or contours) or other patterns. Although patterns such as grids are discussed above, the illumination may also comprise substantially uniform illumination or a spot of any shape (e.g., circular, square, etc.), and still a difference signature or marker may be obtained. The emitted radiation pattern can comprise visible light or invisible light such as infrared light, ultraviolet light, or any other suitable wavelength or range of wavelengths. In some embodiments, an invisible wavelength range such as infrared or ultraviolet may be desirable to avoid distracting the wearer or others by projecting a visible light pattern or visible light. The direction of the radiation pattern may be selected such that at least a portion of the radiation pattern is incident on the surface of the real object. For example, in some configurations, the light source is movable, such as via a gimbal mount or other rotational stages and/or stages that can be tilted. In some embodiments, the radiation may be projected onto a location immediately adjacent to the received location of the virtual object. In the example implementation of a virtual watch, the radiation may be projected onto the back of the wearer's hand or onto the wearer's forearm adjacent to the location of the virtual watch. In other embodiments, the radiation may be projected onto a location spaced from the location of the virtual object.

After the radiation pattern is emitted, a portion of the emitted radiation can be reflected back to the augmented reality display system 2010 by the real object. Some of the emitted radiation may be reflected by an outer surface or an interior structure below the surface of the object. For example, if the radiation pattern is an infrared light pattern directed at the arm or hand of a user, a portion of the infrared light can be reflected by the outer skin surface, an interior region of the skin, and/or veins or other structures beneath the skin. The reflected portion of the radiation pattern may be detected at light detectors 24. For example, the light sources 26 may be infrared sources emitting an infrared radiation pattern, and the light detectors 24 may be infrared cameras configured to obtain images in the infrared spectrum. Thus, when a portion of the emitted radiation pattern is reflected to the display system 2010, the light detectors 24 can obtain an image of the reflected light pattern.

To determine the light difference signature, the image of the reflected light pattern can be compared to the distribution of the emitted radiation pattern. Determination of a light difference signature can occur at processing module 70 or any other local or remote processing circuitry associated with the augmented reality display system 2010. The processing module 70 can look for a unique difference between the emitted and reflected light patterns that can be used as a landmark, marker, or fiducial. If a unique difference is found between the emitted and reflected light patterns, the difference can be stored and a light difference signature or marker recorded. In some cases, a unique difference may be caused by a portion of the real object having a reflectivity different from the surrounding area, e.g., a birthmark, mole, vein, scar tissue, or other structure of an arm or hand. For example, if a region of scar tissue is present in the area that is irradiated and imaged, the light difference between the emitted and reflected radiation distributions can include an anomalous region in the shape of the scar tissue region that can serve as a landmark or difference signature. (Because various types of biological tissue, such as skin, fat, oxygenated blood, deoxygenated blood, etc., may have different infrared absorbance and scattering properties, the radiation pattern may include multiple wavelengths of light in case a unique difference cannot be detected at a first wavelength.) If a detectable and/or locally unique subregion of the light difference is found between the emitted and reflected light patterns, this difference can be stored as a light difference signature. If a unique difference that can be used as a landmark or fiducial is not found after comparing the emitted and reflected light patterns, block 1120 can be repeated by emitting the radiation pattern to a different position on the real object, for example, a location adjacent to a different part of the virtual object location and/or spaced slightly further from the virtual object location. If a unique difference that can be used as a landmark is identified and stored as a light difference signature or marker, the method 1100 continues to block 1130.

At block 1130, the location of the virtual content is determined relative to the light difference signature, a landmark or "difference marker". A location of the light difference signature or landmark or difference marker can serve as a reference point for rendering the virtual content. A displacement can then be determined for the virtual object relative to the reference point. For example, the displacement can include coordinates in one or more dimensions. In some embodiments, the displacement can be a location within a two-dimensional or three-dimensional coordinate system having an origin at the reference point. Thus, when the same light difference signature or marker or landmark is detected again, the virtual content can be rendered at the same location relative to the light difference signature, marker, or landmark.

In some implementations, the light difference signature, marker, or landmark may further be associated with a physical reference point in the real world detectable by the depth sensor 28. The physical reference point may be a feature of the real object, such as a finger or a wrist bone in the virtual watch example described herein. Similar to the location of the virtual object relative to the light difference signature, marker, or landmark, the location of the light difference signature, marker, or landmark relative to the physical reference point can include coordinates in one or more dimensions. The displacements between the virtual object and the light difference marker, or landmark and between the physical reference point and the light difference marker, or landmark can be recorded in the same or different reference frames or coordinate systems.

After the locations of the virtual content and a physical reference point are determined relative to the light difference marker, or landmark, the system 2010 can intermittently or continuously monitor the location of the physical reference point using the depth sensor 28. In some embodiments, the depth sensor 28 may require less power and/or processing capacity than the light detectors 24 and light sources 26 to continuously monitor the location of the real object and/or the physical reference point. Thus, the depth sensor 28 may continuously monitor the location of the physical reference point, while the emission and detection of radiation or the radiation pattern by the light sources 26 and light detectors 24 can be utilized less frequently, such as when a change is detected in the location of the physical reference point, when the virtual content's frame needs to be refreshed, or at any other regular or irregular interval. When the location of the virtual content rendering is to be refreshed, the method 1100 continues to block 1140.

At block 1140, radiation or radiation pattern is emitted again. The radiation emitted at block 1140 can be the same distribution (e.g., a uniform distribution, spot, pattern, texture, or the like) as the radiation emitted at block 1120. The direction of emission of the radiation pattern can be determined based on the location of the physical reference point as tracked by the depth sensor 28 such that the emitted radiation pattern is at least partially incident on a region of the real object where the light difference signature, marker, or landmark is expected to be found. The direction of emission can be selected by pivoting or otherwise moving the light source(s) 24 on a gimbal or other movable mounting platform. For example, in the example of a wearer's arm, the emitted radiation pattern can be directed at the location of the birthmark, veins, or other feature associated with the light difference signature, marker, or landmark based on the calculated displacement from the physical reference point. The radiation or radiation pattern can be emitted by the light sources 24 in the same manner described above with reference to block 1120. After radiation or radiation pattern is emitted, the method 1100 continues to block 1150.

At block 1150, the system 2010 obtains a reflected radiation distribution or pattern and locates the difference signature, marker, or landmark within the reflected radiation distribution or pattern. The reflected radiation or pattern can be detected and/or imaged by light detectors 26 configured to detect light of one or more wavelengths emitted by light sources 24. A difference may then be determined and/or calculated between the emitted radiation pattern and the reflected radiation pattern. The stored light difference signature or marker or landmark can be compared to the difference between the emitted and reflected radiation distributions or pattern to verify the presence and determine the location of the light difference signature, marker or landmark in the newly reflected radiation distribution. The location of the light difference signature, marker, or landmark can then be recorded to serve as a reference point for the rendering of the virtual content when the virtual content is refreshed. After the light difference marker is located within the reflected radiation distribution or difference, the method 1100 continues to block 1160.

At block 1160, the virtual content is rendered relative to the location of the light difference signature, marker, or landmark. The location for rendering the virtual content can be determined based on the displacement between the light difference signature, marker or landmark and the virtual content that was calculated at block 1130. By using the same displacement that was previously calculated, the augmented reality display system 2010 can achieve the advantage of displaying virtual content that appears to move with the associated real object. For example, by repeatedly rendering a virtual watch at the same displacement relative to a light difference signature, marker, or landmark caused by a birthmark or group of veins on a wearer's hand, the face of the virtual watch can appear to remain adjacent to the top side of the wearer's wrist, even as the wearer rotates the wrist or otherwise alters the orientation of the wrist in a manner that cannot reliably be detected by the depth sensor 28 alone. After the virtual content is rendered relative to the light difference signature, marker, or landmark, the method 1100 can return to block 1140, where blocks 1140-1160 may be repeated indefinitely at regular or irregular intervals as necessary whenever the virtual content frame is to be refreshed. For example, the method 1100 can return to block 1140 any time a change in the location of the physical reference point is detected, or at a regular interval such as every second, five times per second, ten times per second, fifty times per second, one hundred times per second, or any other suitable interval. In some embodiments, the light sources 24 may be configured to continuously project radiation such as infrared light, rather than sending discrete pulses of light each time the difference marker is to be located again.

As discussed above, the systems, devices, methods and processes discussed in connection with illumination of a pattern of light apply as well to uniform illumination or projecting a spot of any shape such as a circular spot. Additionally, although the discussion above referred to identifying and using a marker or landmark, multiple markers or landmarks may be identified and used to provide tracking and placement of virtual image content.

It is contemplated that the innovative aspects may be implemented in or associated with a variety of applications and thus includes a wide range of variation. Variations, for example, in the shape, number, and/or optical power of the EPE's are contemplated. The structures, devices and methods described herein may particularly find use in displays such as wearable displays (e.g., head mounted displays) that can be used for augmented and/or virtually reality. More generally, the described embodiments may be implemented in any device, apparatus, or system that can be configured to display an image, whether in motion (such as video) or stationary (such as still images), and whether textual, graphical or pictorial. It is contemplated, however, that the described embodiments may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, head mounted displays and a variety of imaging systems. Thus, the teachings are not intended to be limited to the embodiments depicted solely in the Figures, but instead have wide applicability as will be readily apparent to one having ordinary skill in the art.

Various modifications to the embodiments described in this disclosure may be readily apparent to those skilled in the art, and the generic principles defined herein may be applied to other embodiments without departing from the spirit or scope of this disclosure. Thus, the claims are not intended to be limited to the embodiments shown herein, but are to be accorded the widest scope consistent with this disclosure, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments. Additionally, a person having ordinary skill in the art will readily appreciate, the terms "upper" and "lower", "above" and "below", etc., are sometimes used for ease of describing the figures, and indicate relative positions corresponding to the orientation of the figure on a properly oriented page, and may not reflect the proper orientation of the structures described herein, as those structures are implemented.

Certain features that are described in this specification in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. An augmented reality display system configured to align 3D content with a real object, the system comprising:
   a frame configured to mount on the wearer;
   an augmented reality display attached to the frame and configured to direct images to an eye of the wearer;
   a light source configured to illuminate at least a portion of an object by emitting invisible light;
   a light sensor configured to image the portion of the object illuminated by the light source using the invisible light;
   a depth sensor configured to detect a location of the object; and
   processing circuitry configured to:
      monitor the location of the object using the depth sensor periodically at a first frequency; and
      monitor periodically, at a second frequency less frequent than the first frequency, an orientation of the object based on one or more characteristics of a feature in the image formed using a reflected portion of the invisible light.

2. The augmented reality display system of claim 1, wherein the processing circuitry is further configured to render augmented reality content onto a view of the object through the augmented reality display.

3. The augmented reality display of claim 2, wherein the processing circuitry is configured to orient the rendered augmented reality content based at least in part on the monitored orientation of the object.

4. The augmented reality display system of claim 1, wherein the processing circuitry is further configured to determine a difference between a distribution of the emitted invisible light and a distribution of the reflected portion of the invisible light.

5. The augmented reality display system of claim 4, wherein the processing circuitry is further configured to identify a difference signature based on the determined difference.

6. The augmented reality display system of claim 5, wherein the processing circuitry is further configured to detect the feature in the image based at least in part on the difference signature.

7. The augmented reality display system of claim 6, wherein the processing circuitry is further configured to select and store the feature to be used as a marker for rendering augmented reality content onto a view of the object through the augmented reality display.

8. The augmented reality display system of claim 7, wherein the object comprises skin of the wearer or of a person other than the wearer.

9. The augmented reality display system of claim 8, wherein the feature comprises a preexisting surface feature of the skin.

10. The augmented reality display system of claim 1, wherein the augmented reality display is configured to transmit light from an environment in front of the wearer to the wearer's eye to provide a view of the environment in front of the wearer while the augmented reality display directs images to the eye of the wearer.

11. A method for aligning 3D content with a real object, the method comprising, under control of processing circuitry:
   causing a light source of an augmented reality display system to emit invisible light to illuminate at least a portion of an object;
   imaging the portion of the object illuminated by the light source using a light sensor of the augmented reality display system;
   monitoring periodically, at a first frequency, a location of the object using a depth sensor of the augmented reality display system;
   monitoring periodically, at a second frequency less frequent than the first frequency, an orientation of the object based on one or more characteristics of a feature in the image formed using a reflected portion of the invisible light; and
   rendering, to a wearer of the augmented reality display system, augmented reality content onto a view of the object through an augmented reality display of the augmented reality display system.

12. The method of claim 11, wherein the rendered augmented reality content is oriented based at least in part on the monitored orientation of the object.

13. The method of claim 11, wherein a virtual location of the rendered augmented reality content is determined based at least in part on the monitored location of the object.

14. The method of claim 11, further comprising determining a difference between a distribution of the emitted invisible light and a distribution of the reflected portion of the invisible light.

15. The method of claim 14, further comprising identifying a difference signature based on the determined difference.

16. The method of claim 15, further comprising detecting the feature in the image based at least in part on the difference signature.

17. The method of claim 16, further comprising selecting and storing the feature to be used as a marker for rendering the augmented reality content onto the view of the object.

18. The method of claim 17, wherein the object comprises skin of the wearer or of a person other than the wearer.

19. The method of claim 18, wherein the feature comprises a preexisting surface feature of the skin.

20. The method of claim 19, wherein the feature comprises a birthmark, a mole, or scar tissue.

* * * * *